United States Patent
Arafune et al.

(10) Patent No.: US 7,466,902 B2
(45) Date of Patent: Dec. 16, 2008

(54) H. 264 CODEC IC, DVD PLAYBACK APPARATUS, H. 264 CODEC METHOD

(75) Inventors: Takeo Arafune, Yokohama (JP); Masaki Nakagawa, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 945 days.

(21) Appl. No.: 10/898,991

(22) Filed: Jul. 27, 2004

(65) Prior Publication Data
US 2005/0180511 A1    Aug. 18, 2005

(30) Foreign Application Priority Data
Feb. 13, 2004  (JP) .............................. 2004-035965

(51) Int. Cl.
*H04N 5/91* (2006.01)
*H04N 9/79* (2006.01)
*H04N 5/00* (2006.01)

(52) U.S. Cl. ........................... 386/95; 386/45; 386/125; 386/126

(58) Field of Classification Search ................... 386/45, 386/95, 125–126
See application file for complete search history.

(56) References Cited

U.S. PATENT DOCUMENTS
6,636,563 B2 * 10/2003 Tsukagoshi ............ 375/240.12

FOREIGN PATENT DOCUMENTS

| JP | 11-196077 | 7/1999 |
| JP | 2000-341258 | 12/2000 |
| JP | 2002-354419 | * 6/2002 |

OTHER PUBLICATIONS

Official Translation of JP 2002-354419, Dec. 6, 2002.*

* cited by examiner

*Primary Examiner*—Thai Tran
*Assistant Examiner*—Daquan Zhao
(74) *Attorney, Agent, or Firm*—Pillsbury Winthrop Shaw Pittman LLP

(57) ABSTRACT

Disclosed is an H.264 codec IC including: a first interface to which a value of an STC obtained at a timing synchronous with a vertical synchronizing signal is inputted from an external part; a second interface to which the vertical synchronizing signal is inputted from the external part; a comparing circuit which compares at a timing synchronous with the inputted vertical synchronizing signal a value of a PTS included in an input data stream with the inputted value of the STC; and a decoding circuit which updates and outputs a decoded result when the result of the comparison in the comparing circuit shows that the value of the STC is equal to or larger than the value of the PTS, and also disclosed are a DVD playback apparatus that uses such an IC and an H.264 codec method.

1 Claim, 10 Drawing Sheets

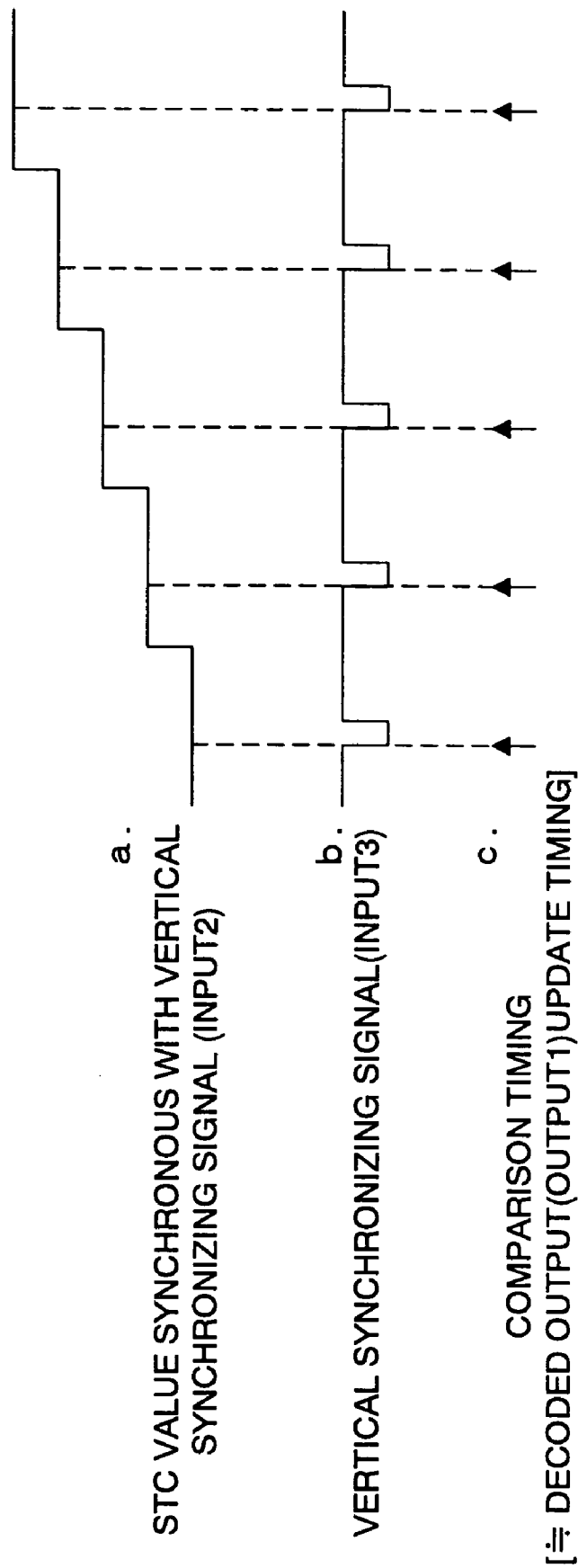

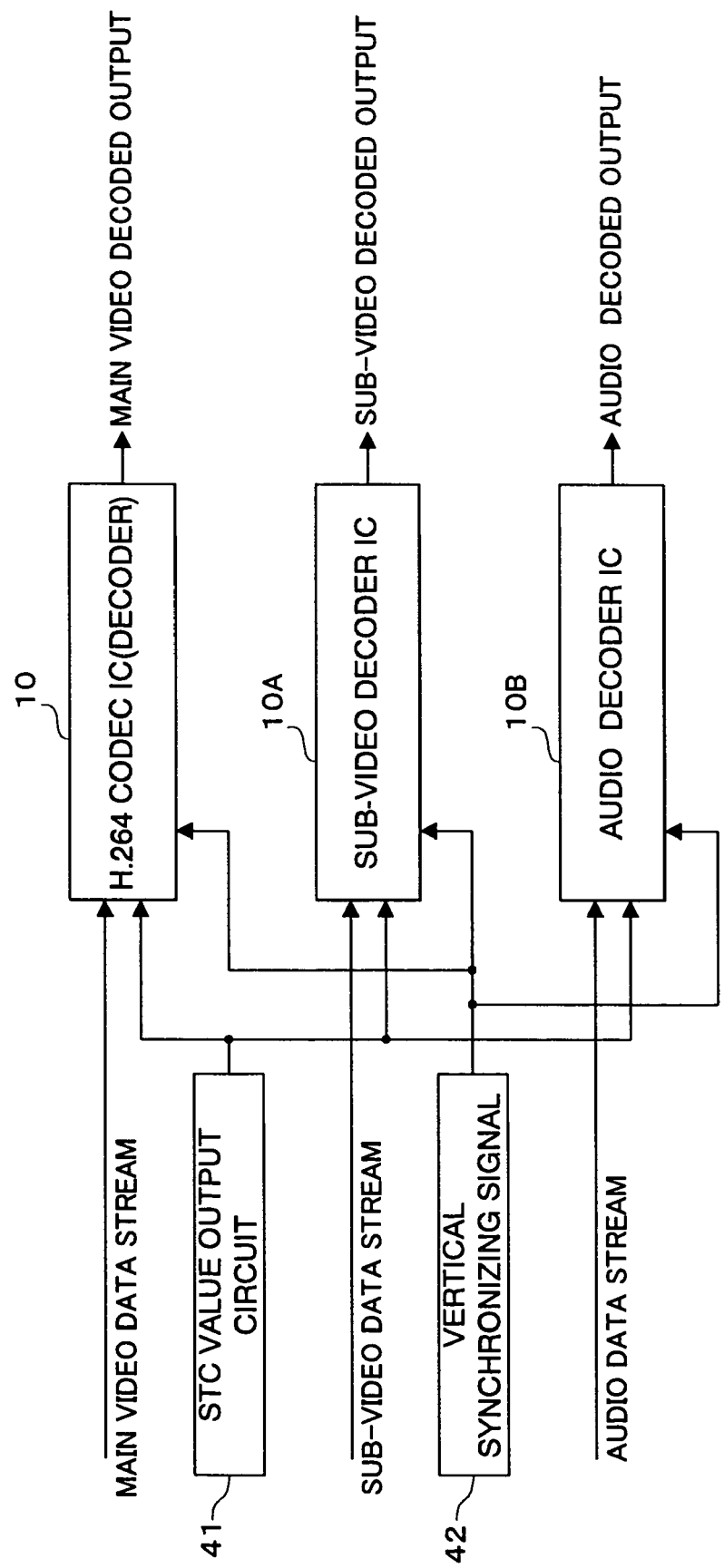

H. 264 CODEC IC, DVD PLAYBACK APPARATUS, H. 264 CODEC METHOD

CROSS-REFERENCE TO RELATED APPLICATIONS

This application is based upon and claims the benefit of priority from the prior Japanese Patent Application No. 2004-35965, filed on Feb. 13, 2004; the entire contents of which are incorporated herein by reference.

BACKGROUND

1. Field of the Invention

The present invention relates to an H.264 codec IC (integrated circuit) and an H.264 codec method that perform compression/expansion processing compliant with H.264 which is a standard for the compression/expansion of main video data and defined by ITU (International Telecommunication Union), and a DVD (digital versatile disc) playback apparatus that uses such an IC, and more particularly, to an H.264 codec IC and an H.264 codec method dealing higher-definition data, and a DVD playback apparatus that uses such an IC.

2. Description of the Related Art

The standards for an HD (high definition)-DVD that is a next generation DVD are currently under drafting process. It is expected to be highly possible that H.264 will be adopted as a codec (compression/expansion) of main video data in the next generation DVD. Note that in the following description, compression and expansion will be also expressed as encoding and decoding respectively.

Japanese Patent Application Laid-open No. 2000-341258 (Patent document 1) discloses a technique of establishing synchronization of video and multichannel audio in a compression process of data codec. Such encoding enables a decoding side to playback the video and the audio at the proper timing. Further, Japanese Patent Application Laid-open No. Hei 11-196077 (Patent document 2) discloses a technique of establishing frame synchronization of data output in a data decoding process.

[Patent document 1] Japanese Patent Application Laid-open No. 2000-341258

[Patent document 2] Japanese Patent Application Laid-open No. Hei 11-196077

Since a codec IC for decoding respective data of main video, sub-video and audio recorded on a next-generation DVD needs a larger circuit scale, it is highly possible that codec integrated circuits that are formed individually for the respective data will be used during initial phases. In this case, the output timing of each decoder is determined based on a presentation time stamp (PTS) written on a header of each packetized data. As a prerequisite for this, each decoder is supplied with a value of a system time clock (STC).

However, if the time required for the supplied value of the STC to be reflected in each decoder is different, there naturally occurs a difference in the timing among the respective decoded data of the main video, the sub-video, and the audio. Incidentally, neither of the afore Patent documents 1, 2 mentions such a problem.

SUMMARY

The present invention was made in view of such circumstances, and an object thereof is to provide an H.264 codec IC and an H.264 codec method that perform compression/expansion processing compliant with H.264, and a DVD playback apparatus that uses such an IC, and more particularly, to provide an H.264 codec IC and an H.264 codec method capable of controlling the output timing of respective decoded data of main video, sub-video, and audio as intended even when higher-definition data is dealt, and a DVD playback apparatus that uses such an IC.

In order to solve the problem stated above, an H.264 codec IC according to one of the aspects of the present invention includes: a first interface to which a value of a system time clock (STC) obtained at a timing synchronous with a vertical synchronizing signal is inputted from an external part; a second interface to which the vertical synchronizing signal is inputted from the external part; a comparing circuit which compares at a timing synchronous with the inputted vertical synchronizing signal a value of a presentation time stamp (PTS) included in an input data stream with the inputted value of the system time clock (STC); and a decoding circuit which updates and outputs a decoded result when a result of the comparison in the comparing circuit shows that the value of the system time clock (STC) is equal to or larger than the value of the presentation time stamp (PTS).

Thus, the comparing circuit is provided, and the comparing circuit compares at the timing synchronous with the vertical synchronizing signal the value of the PTS included in the input data stream with the inputted value of the STC. Then, the decoding circuit updates and outputs the decoded result when the value of the STC is equal to or larger than the value of the PTS. Accordingly, the updating and outputting of the decoded result is necessarily synchronized with the vertical synchronizing signal. This makes it possible to control the updating and outputting at a specific timing. Consequently, for example, it is possible to control the output timing of respective decoded data of main video, sub-video, and audio as intended even when high-definition data is dealt. Note that the reason for not updating or outputting the decoded result when the value of the STC is less than the value of the PTS is that this instant is not yet the timing to output the decoded result.

A DVD (digital versatile disc) playback apparatus according to another aspect of the present invention includes:

a first integrated circuit including a system time clock value output circuit outputting a value of a system time clock at a timing synchronous with a vertical synchronizing signal;

a second integrated circuit including a vertical synchronizing signal output circuit outputting the vertical synchronizing signal; and an H.264 codec integrated circuit having: a first interface to which the outputted value of the system time clock is inputted; a second interface to which the outputted vertical synchronizing signal is inputted; a comparing circuit which compares at the timing synchronous with the inputted vertical synchronizing signal a value of a presentation time stamp included in an inputted main video data stream with the inputted value of the system time clock; and a decoding circuit which updates and outputs a decoded result when a result of the comparison in the comparing circuit shows that the value of the system time clock is equal to or larger than the value of the presentation time stamp;

a sub-video decoder integrated circuit having: a first interface to which the outputted value of the system time clock is inputted; a second interface to which the outputted vertical synchronizing signal is inputted; a comparing circuit which compares at the timing synchronous with the inputted vertical synchronizing signal a value of a presentation time stamp included in an inputted sub-video data stream with the inputted value of the system clock; and a decoding circuit which updates and outputs a decoded result when a result of the comparison in the comparing circuit shows that the value of the system time clock is equal to or larger than the value of the presentation time stamp; and an audio decoder integrated circuit having: a first interface to which the outputted value of the system time clock is inputted; a second interface to which the outputted vertical synchronizing signal is inputted; a comparing circuit which compares at the timing synchronous with the inputted vertical synchronizing signal a value of a presentation time stamp included in an inputted audio data stream with the inputted value of the system time clock; and a decoding circuit which outputs a decoded result when a result of the comparison in the comparing circuit shows that the value of the system time clock is equal to or larger than the value of the presentation time stamp.

This DVD playback apparatus utilizes the aforesaid H.264 codec IC and the decoders having the same configuration with that of the H.264 codec IC, and further includes the first IC having the system time clock value output circuit which outputs the value of the STC at the timing synchronous with the vertical synchronizing signal and the second IC having the vertical synchronizing signal output circuit which outputs the vertical synchronizing signal, so that it is capable of playing back the main video, the sub-video, and the audio. Here, the output timing of each of the H.264 codec IC and the decoders is controlled as desired in the manner described above. This makes it possible to control the timing of decoded data of each of the main video, the sub-video, and the audio as intended even when high-definition data is dealt.

An H.264 codec method according to still another aspect of the present invention includes: inputting from an external part a value of a system time clock obtained at a timing synchronous with a vertical synchronizing signal; inputting the vertical synchronizing signal from the external part; comparing at the timing synchronous with the vertical synchronizing signal a value of a presentation time stamp included in an input data stream with the inputted value of the system time clock; and updating and outputting a decoded result when a result of the comparison shows that the value of the system time clock is equal to or larger than the value of the presentation time stamp.

Thus, the value of the PTS included in the input data stream is compared with the inputted value of the STC at the timing synchronous with the vertical synchronizing signal. Then, when the value of the STC is equal to or larger than the value of the PTS, the decoded result is updated and outputted. Accordingly, the updating and outputting of the decoded result is necessarily synchronized with the vertical synchronizing signal. This makes it possible to control the updating and outputting at a specific timing. Consequently, it is possible to control the output timing of respective decoded data of the main video, the sub-video, and the audio as intended even when high-definition data is dealt.

According to the present invention, it is possible to provide an H.264 codec IC and an H.264 codec method capable of controlling the timing of respective decoded data of main video, sub-video, audio as intended even when higher-definition data is dealt, and a DVD playback apparatus that uses such an IC.

BRIEF DESCRIPTION OF THE DRAWINGS

FIG. 2 is an explanatory chart showing the operation of the embodiment shown in FIG. 1A and FIG. 1B.

FIG. 4 is a block diagram showing the configuration of a DVD playback apparatus according to one embodiment of the present invention.

DETAILED DESCRIPTION

Description of Embodiments

Embodiments of the present invention will be described with reference to the drawings, but these drawings are presented only for the illustrative purpose and in no respect, are intended to limit the present invention.

As a form of the embodiment of the H.264 codec IC of the present invention, the first interface may be an interface to which the value of the system time clock transmitted by serial transmission is inputted from the external part. The serial transmission only requires a small number of connecting lines (the transmission of the value of the system time clock requires one connecting line), which simplifies the configuration (for example, the number of pins) as an IC.

As a form of the embodiment in the DVD playback apparatus of the present invention, the first integrated circuit may further has: a function of demultiplexing the inputted data stream to a main video data stream, a sub-video data stream, and an audio data stream; and a function of rewriting respective values of the presentation time stamps/decode time stamps included in the main video data stream, the sub-video data stream, and the audio data stream obtained by the demultiplexing, and the main video data stream, the sub-video data stream, and the audio data stream obtained by the demultiplexing may be supplied to the H.264 codec integrated circuit, the sub-video decoder integrated circuit, and the audio decoder integrated circuit respectively. The rewrite of the presentation time stamps (PTS)/decode time stamps (DTS) makes it possible to properly respond to, for example, the change of the playback position while the playback state is kept continued.

Here, the function of rewriting the values of the presentation time stamps/decode time stamps in the first integrated circuit may be a function of rewriting by adding, to the value of the presentation time stamp/decode time stamp before the rewrite, a difference value (a value corresponding to a gap in the STC) between a playback end time ($VOBU_{13}E_{13}PTM$) of VOB (video object) unit video data at an instant prior to system time clock discontinuity and a playback start time ($VOBU_{13}S_{13}PTM$) of the VOB unit video data at an instant after the system time clock discontinuity. The difference value between the playback end time ($VOBU_{13}E_{13}PTM$) of the VOB unit video data at the instant prior to the system time clock discontinuity and the playback start time ($VOBU_{13}S_{13}PTM$) of the VOB unit video data at the instant after the system time clock discontinuity represents a difference in the playback position, and adding this value to the original value (before the rewrite) of the presentation time stamp/decode time stamp allows the playback state to continue according to the value of the STC.

Figure 1A:
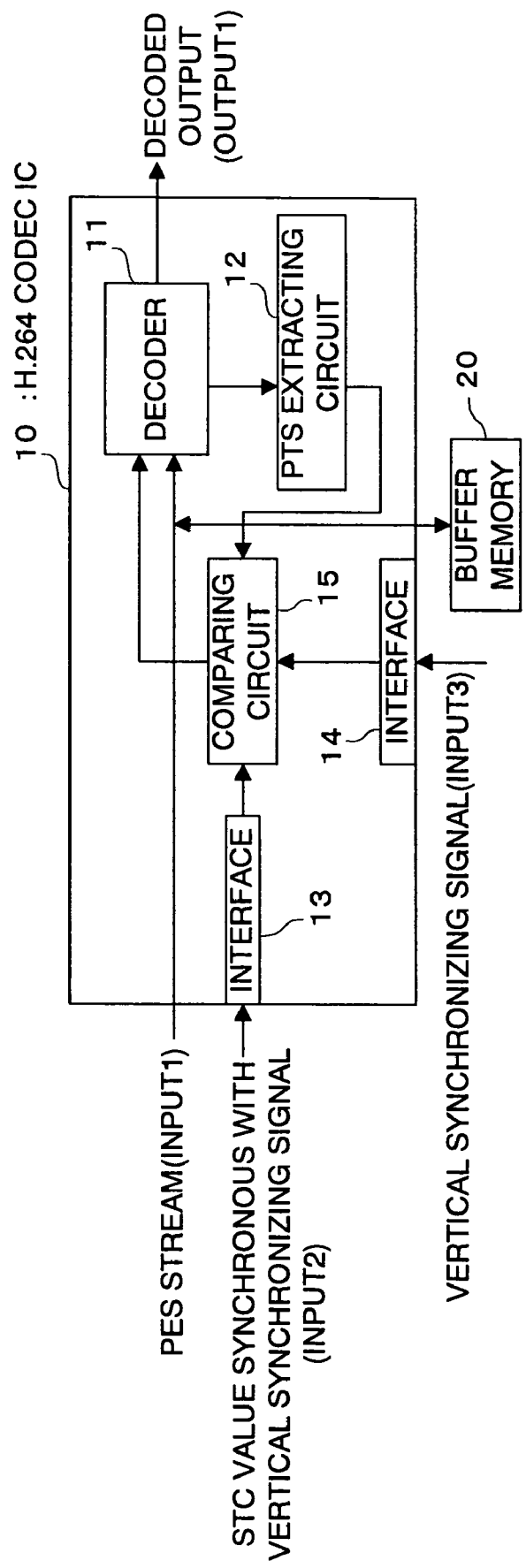
FIG. 1A is a block diagram showing the configuration of an H.264 codec IC according to one embodiment of the present invention.
Figure 1B:
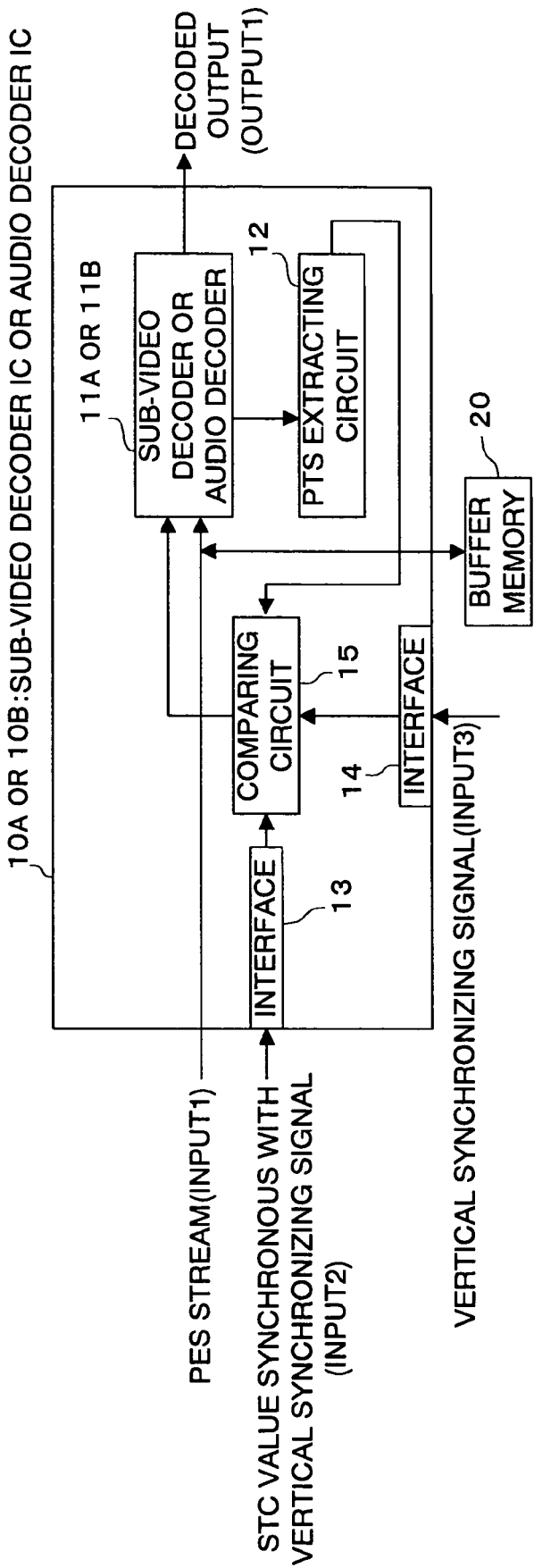
FIG. 1B is a block diagram showing the configuration of a sub-video decoder IC or an audio decoder IC according to the embodiment of the present invention.

Based on the above description, embodiments of the present invention will be hereinafter described with reference to the drawings. FIG. 1A is a block diagram showing the configuration of an H.264 codec IC according to one embodiment of the present invention, and FIG. 1B is a block diagram showing the configuration of a sub-video decoder IC or an audio decoder IC according to the embodiment of the present invention. As shown in FIG. 1A, this H.264 codec IC 10 has a main video decoder 11, a PTS extracting circuit 12, interfaces 13, 14, and a comparing circuit 15. Further, a buffer memory 20 is used for the IC 10. Signals supplied to the IC 10 will be assumed to be signals including video information.

As shown in FIG. 1B, each of a sub-video decoder IC 10A and an audio decoder IC 10B has, in addition to a sub-video decoder 11A or an audio decoder 11B, a PTS extracting circuit 12, interfaces 13, 14, and a comparing circuit 15. A buffer memory 20 is also used for each of the IC 10A and IC 10B. Note that the IC 10, IC 10A, and IC 10B can include other constituent elements (for example, an encoder or the like since they are codec ICs). However, these constituent elements, which are not directly related to the features of this embodiment, are omitted in the drawings. In the description, signals supplied to the IC 10A are assumed to be signals including sub-video information and signals supplied to the IC 1B are assumed to be signals including audio information. However, the IC 10A and the IC 10B have substantially the same internal configuration as that of the IC 10, and therefore, only FIG. 1A will be described, instead of repeating the description of FIG. 1B.

The decoder 11 is a circuit that receives a PES (packetized elementary stream) stream (an input 1) including video information to decode (expand) the PES stream to data with the original size. The decoded data is outputted from the IC 10 (an output 1). This decoding is based on the standard H.264 recommended by ITU. The scale of the decoder 11 is, for example, at least about several million elements in terms of the number of elements. The PES stream is a stream of packetized data, and its header includes a PTS. In some cases, a DTS (decode time stamp) is also included in addition to the PTS.

The PTS extracting circuit 12 extracts the PTS from each header of the PES stream supplied to the decoder 11. The extracted PTS is supplied to the comparing circuit 15. The interface 13 is an interface (for example, a latch) to which a value of an STC (an input 2) synchronous with a vertical synchronizing signal is inputted. The configuration as an interface can be appropriately selected depending on how the value of the STC synchronous with the vertical synchronizing signal is supplied, for example, the supply by serial data or by parallel data. The inputted value of the STC is supplied as another input of the comparing circuit 15.

The interface 14 is an interface (for example, a latch) to which the vertical synchronizing signal (an input 3) is inputted. The inputted vertical synchronizing signal is supplied to the comparing circuit 15. The comparison timing of the comparing circuit 15 is synchronous with the supplied vertical synchronizing signal. What are compared are the aforesaid "extracted PTS" and "value of the STC synchronous with the vertical synchronizing signal". The comparison result is given to the decoder 11. The decoder 11 updates and outputs the decoded result when "the value of the STC synchronous with the vertical synchronizing signal" is equal to or larger than the value of "the extracted PTS".

Note that the buffer memory 20 temporarily stores and holds the PES stream to be decoded by the decoder 11, when necessary. The buffer memory 20 may also be installed inside the H.264 codec IC 10.

According to the H.264 codec IC 10 having the configuration shown in FIG. 1A, the decoded result of the decoder 11 is updated necessarily according to the comparison timing in the comparing circuit 15, namely, at the timing synchronous with the vertical synchronizing signal (the input 3) inputted to the interface 14. Accordingly, a decoded output controlled by the vertical synchronizing signal inputted to the interface 14 is obtainable. In other words, the timing of the decoded output is arbitrarily controlled based on an external command.

The reason why the decoder 11 is not requested to update the decoded output when "the value of the STC synchronous with the vertical synchronizing signal" is less than "the extracted PTS" is that this instant is not yet the timing for the data of the PES stream including the extracted PTS to be outputted as the decoded output. This is obvious considering the fact that the STC corresponds to a clock as a system and counts up with time, and that the PTS is a time stamp instructing the display timing.

When this H.264 codec IC 10 is actually used in, for example, a DVD playback apparatus, a circuit outputting the STC synchronous with the vertical synchronizing signal and a circuit outputting the vertical synchronizing signal are necessary. An existing technique can be used to configure these circuits.

FIG. 2 is an explanatory chart showing the operation of the H.264 codec IC of the embodiment shown in FIG. 1A. "a." in FIG. 2 shows "the value of the STC synchronous with the vertical synchronizing signal" (the input 2) inputted to the interface 13. As shown by "a.", "the value of the STC synchronous with the vertical synchronizing signal" presents a value that increases every time a period synchronous with the vertical synchronizing signal starts. The phase relationship with the vertical synchronizing signal can be assumed to vary. "b." in FIG. 2 is the vertical synchronizing signal (the input 3) inputted to the interface 14. "c." in FIG. 2 shows the comparison timing by the comparing circuit 15, and is set to, for example, the timing of a front edge of the vertical synchronizing signal (the input 3) in this drawing. This timing is substantially the same as the update timing of the decoded output of the decoder 11 as previously described.

Figure 3A:
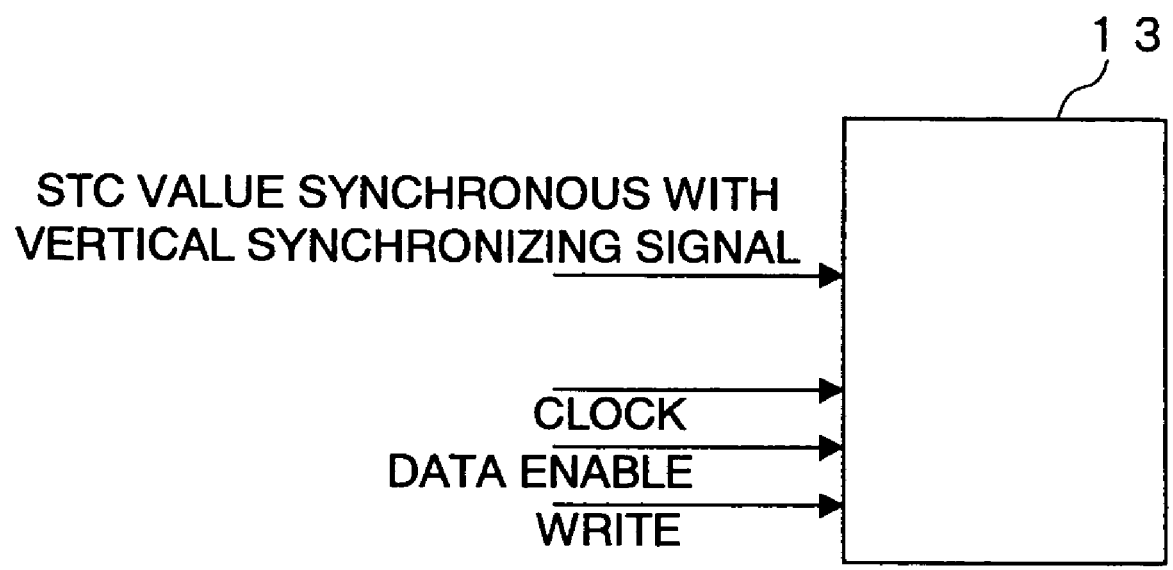
FIG. 3A and FIG. 3B are explanatory charts of an example of an interface 13 shown in FIG. 1A and FIG. 1B and the operation thereof respectively.
Figure 3B:
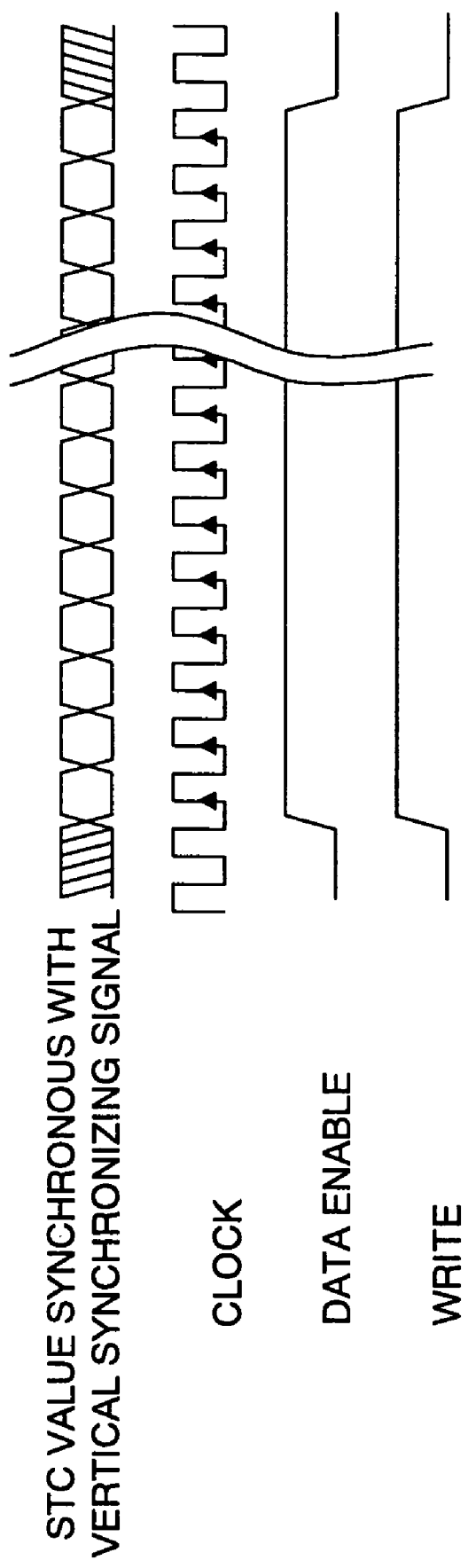

FIG. 3A and FIG. 3B are charts further explaining the embodiment described with reference to FIG. 1A, FIG. 1B, and FIG. 2, in particular, an example of the interface 13 to which the value of the STC synchronous with the vertical synchronizing signal is inputted. In this example, as shown in FIG. 3B, the interface 13 is configured to receive the value of the STC synchronous with the vertical synchronizing signal by one-bit width serial data, and the interface 13 is further supplied with signals of "a clock", "a data enable", and "a write".

FIG. 3B shows these signals in time series. Specifically, "the value of the STC synchronous with the vertical synchronizing signal" that is serial data is received as an array of high/low at, for example, risings (shown by the arrows) of "the clock" during periods in which "the data enable" is high and "the write" is high. Such receipt by the serial data only requires one connecting line for receiving "the value of the STC synchronous with the vertical synchronizing signal". Moreover, when the same configuration is applied, an interface to receive or output various kinds of data can be realized in such a manner, for example, that an address and some data (including a case where the data is "the value of the STC synchronous with the vertical synchronizing signal") corresponding to this address are included in the serial data, an "address/data" signal is provided, and "the write" is replaced by a "write/read" signal. This configuration is useful for inputting/outputting a command signal in a case, for example, where this codec IC is made further multifunctional.

Next, a DVD playback apparatus according to one embodiment of the present invention will be described with reference to FIG. 4. FIG. 4 is a block diagram showing the configuration of the DVD playback apparatus according to one embodiment of the present invention. This DVD playback apparatus is constituted, using, in addition to the above-described H.264 codec IC 10, a sub-video decoder IC 10A and an audio decoder IC 10B which have substantially the same internal configuration as that of the IC 10. Note that buffer memories (corresponding to the buffer memory 20 in FIG. 1A and FIG. 1B) are to be provided for the ICs 10, 10A, 10B respectively, but these buffer memories are omitted in the drawing.

The H.264 codec IC 10 is capable of controlling the timing of a decoded output through the use of a vertical synchronizing signal as an external command as previously described. This H.264 codec IC 10 is used for main video decoding. "A value of an STC synchronous with the vertical synchronizing signal" necessary for the H.264 codec IC 10 is supplied from an STC value output circuit 41. Further, the vertical synchronizing signal also necessary is supplied from a vertical synchronizing signal output circuit 42. The STC value output circuit 41 and the vertical synchronizing signal output circuit 42 may be individually provided ICs respectively. The functions of these circuits are realizable by an existing technique.

In this DVD playback apparatus, the IC 10A and the IC 10B are further used for sub-video decoding and audio decoding respectively. These ICs 10A, 10B are also supplied with the same "value of the STC synchronous with the vertical synchronizing signal" and vertical synchronizing signal from the STC value output circuit 41 and the vertical synchronizing signal output circuit 42 respectively. This is intended for establishing the synchronization based on the vertical synchronizing signal at the instant when decoded video and decoded audio are outputted.

Specifically, the sub-video decoder IC 10A decodes sub-video information, and the internal configuration thereof is basically the same as that of the H.264 codec IC 10 shown in FIG. 1A. The audio decoder IC 10B decodes audio information, and the internal configuration thereof is basically the same as that of the codec IC 10 shown in FIG. 1A. However, the functions of the audio decoder IC 10B as the decoder is somewhat changed. Specifically, in the audio decoder, the decoded result is outputted when "the value of the STC synchronous with the vertical synchronizing signal" is equal to or larger than the "extracted PTS". When "the value of the STC synchronous with the vertical synchronizing signal" is less than "the extracted PTS", the decoder is not requested for the decoded output. This is because that this instant is not yet the timing to output, as the decoded output, the data of a stream including the extracted PTS. The result of not demanding for the decoded output is, for example, muting of an audio output.

According to the DVD playback apparatus having the configuration as described above, the accurate synchronization among the videos and the audio can be established, in spite that the three decoders are separately provided for the main video, the sub-video, and the audio. Further, since the three decoder ICs are separately provided, the integration scale of each decoder IC is not very large. This is an advantageous configuration for quickly realizing a DVD playback apparatus of high-definition video data.

Incidentally, FIG. 4 does not show a constituent element that demultiplexes the data stream to three data streams, namely, a PES stream as a main video data stream, a PES stream as a sub-video data stream, and a PES stream as an audio data stream. The description of an example of this constituent element will be included in the following description of a DVD playback apparatus according to another embodiment.

Figure 5A:
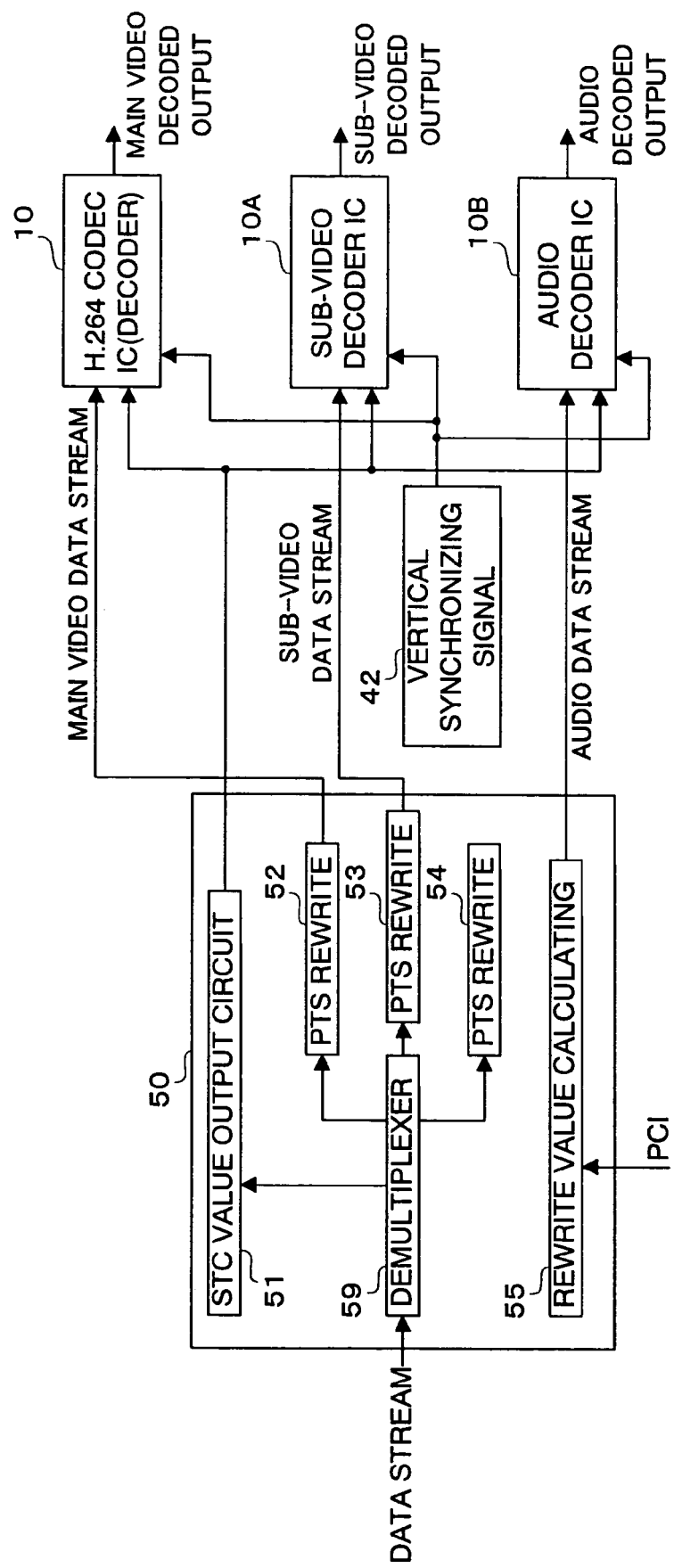
FIG. 5A and FIG. 5B are block diagrams showing the configurations of DVD playback apparatuses according to different embodiments respectively.
Figure 5B:
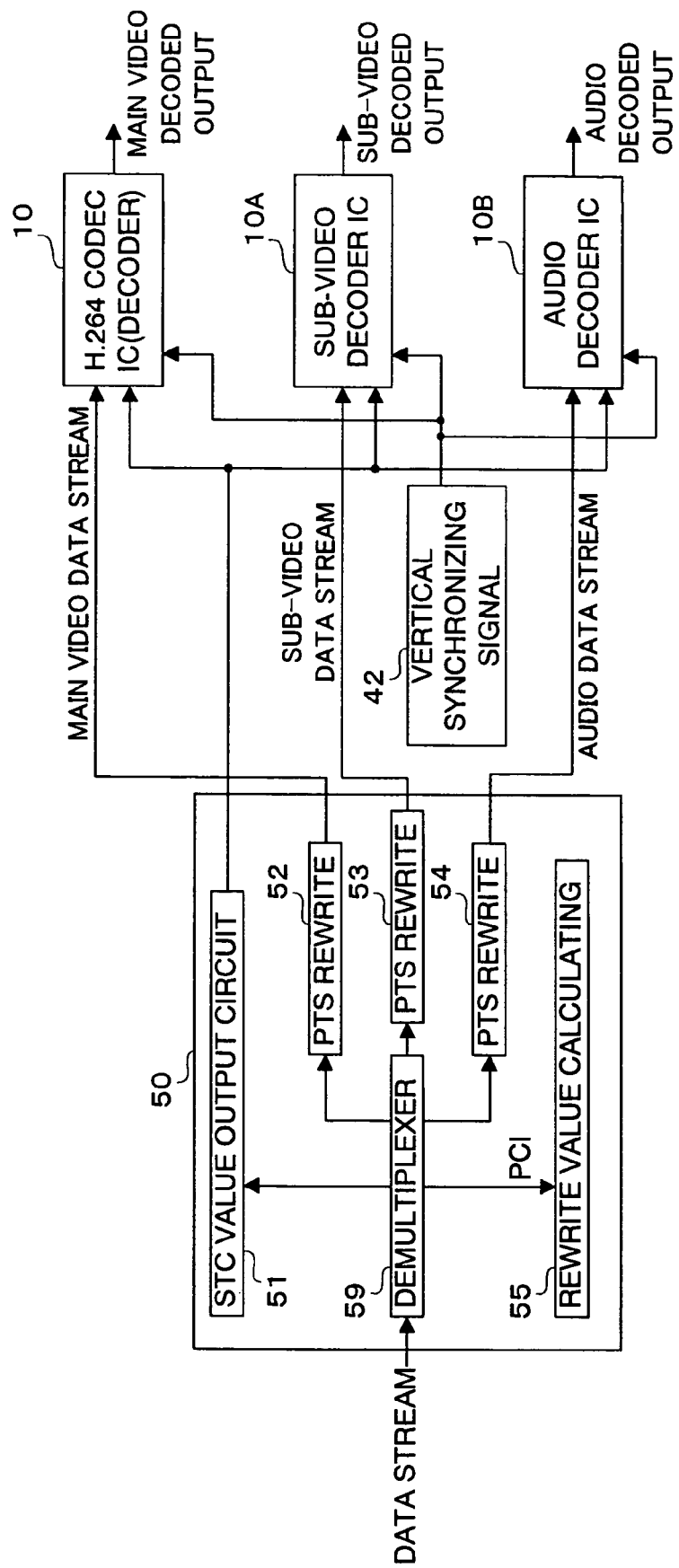

Next, DVD playback apparatuses according to other embodiments of the present invention will be described with reference to FIG. 5A and FIG. 5B. FIG. 5A and FIG. 5B are block diagrams showing the configurations of the DVD playback apparatuses according to the other embodiments of the present invention respectively. In FIG. 5A and FIG. 5B, the same reference numerals and symbols are used to designate the same elements as those shown in FIG. 4, and description thereof will be omitted. In these embodiments, provided is a main video/sub-video/audio stream dividing IC 50 that demultiplexes a data stream to three data streams, namely, a main video data stream, a sub-video data stream, and an audio data stream. The IC 50 has a built-in STC value output circuit 51 and also has built-in functions each rewriting a PTS so that the playback state smoothly continues when the playback position jumps, that is, when STC values are not continuous at the playback time. The STC value output circuit 51 has the same function as that of the STC value output circuit 41 in FIG. 4.

A demultiplexer 59 of the main video/sub-video/audio stream dividing IC 50 demultiplexes the inputted data stream to the three data streams, namely, the main video data stream, the sub-video data stream, and the audio data stream. Each of the demultiplexed data streams is a PES packet, and a header of the packet includes the PTS. Each of PTS rewrite circuits 52, 53, 54 is disposed on an output side of the demultiplexer 59, and rewrites and outputs the PTS when the playback position jumps. A rewrite value calculating circuit 55 is installed in the main video/sub-video/audio stream dividing IC 50 and calculates a value of the PTS that is to be rewritten based on PTM (presentation time) in PCI (presentation control information) being navigation data that is included in a VOB (video object) unit to control the playback of the VOB unit.

Incidentally, in FIG. 5A, the PCI is inputted as an input different from the data stream. However, since the PCI is also originally included in the VOB unit, the PCI or a navigation packet including the PCI may be separated in the demultiplexer 59 in the main video/sub-video/audio stream dividing IC 50, as shown in FIG. 5B.

Generally, when the playback position jumps, only the PTS jumps if the currently obtained STC is based on the state before the playback position jumps, so that the playback state does not continue. One method of solving this problem is to obtain the STC based on the state after the playback position jumps. This method requires some processing. For example, the PTM in the PCI that is the navigation data to control the playback of the VOB unit is used in the calculation of the STC value. Specifically, a difference value (a value corresponding to a gap of the STC) between a playback end time $(VOBU_{13}E_{13}PTM)$ of VOB unit video data at an instant prior to system time clock discontinuity and a playback start time $(VOBU_{13}S_{13}PTM)$ of the VOB unit video data at an instant after the system time clock discontinuity is subtracted from the value of the STC before the rewrite, and this calculated value is defined as the STC value after the rewrite.

The value to be subtracted here is calculated as follows and conceptually is a value shown in FIG. 6A.

$$STC\ Gap = VOBU(n)_{13}E_{13}PTM - VOBU(n+1)_{13}S_{13}PTM$$

Figure 6A:
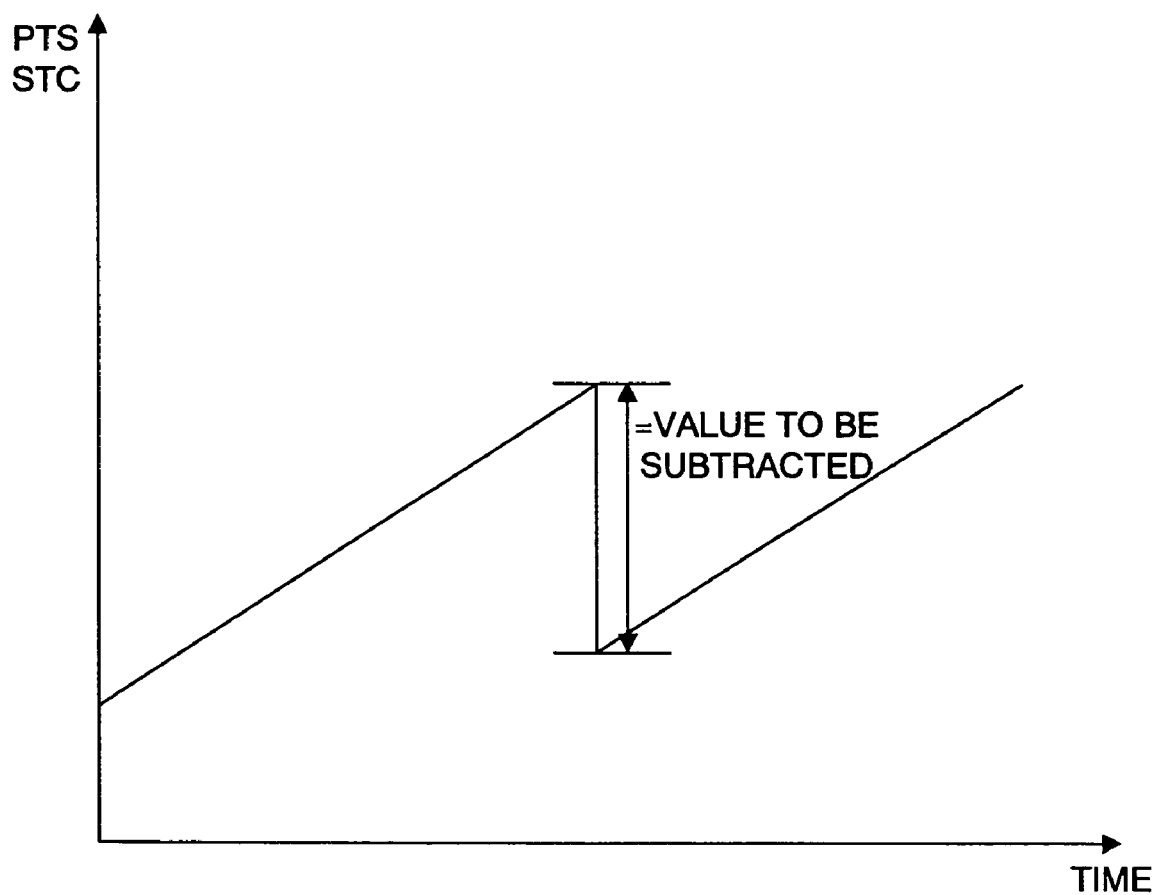
FIG. 6A is an explanatory chart showing the change in STC/PTS value according to a prior art.

In FIG. 6A, the horizontal axis takes the time and the vertical axis takes the PTS. However, if there occurs a difference in the time taken for the supplied values of the STC to be reflected in the respective decoders, it naturally causes a deviation in the timing of the respective decoded data of the main video, sub-video, and audio. Instead of this method, in this embodiment, the PTS of each of the PES streams is rewritten when the playback position jumps.

The PTM in the PCI being the navigation data that controls the playback of the VOB unit is used for the calculation of the PTS value after the rewrite. Specifically, a difference value (a value corresponding to a gap of the STC) between $VOBU_{13}E_{13}PTM$ at an instant prior to system time clock discontinuity and $VOBU_{13}S_{13}PTM$ at an instant after the system time clock discontinuity is added to the value of the PTS before the rewrite, and the calculated value is defined as the value of the PTS after the rewrite. The value to be added is calculated as follows and is conceptually a value shown in FIG. 6B.

$$STC\ Gap = VOBU(n)_{13}E_{13}PTM - VOBU(n+1)_{13}S_{13}PTM$$

Figure 6B:
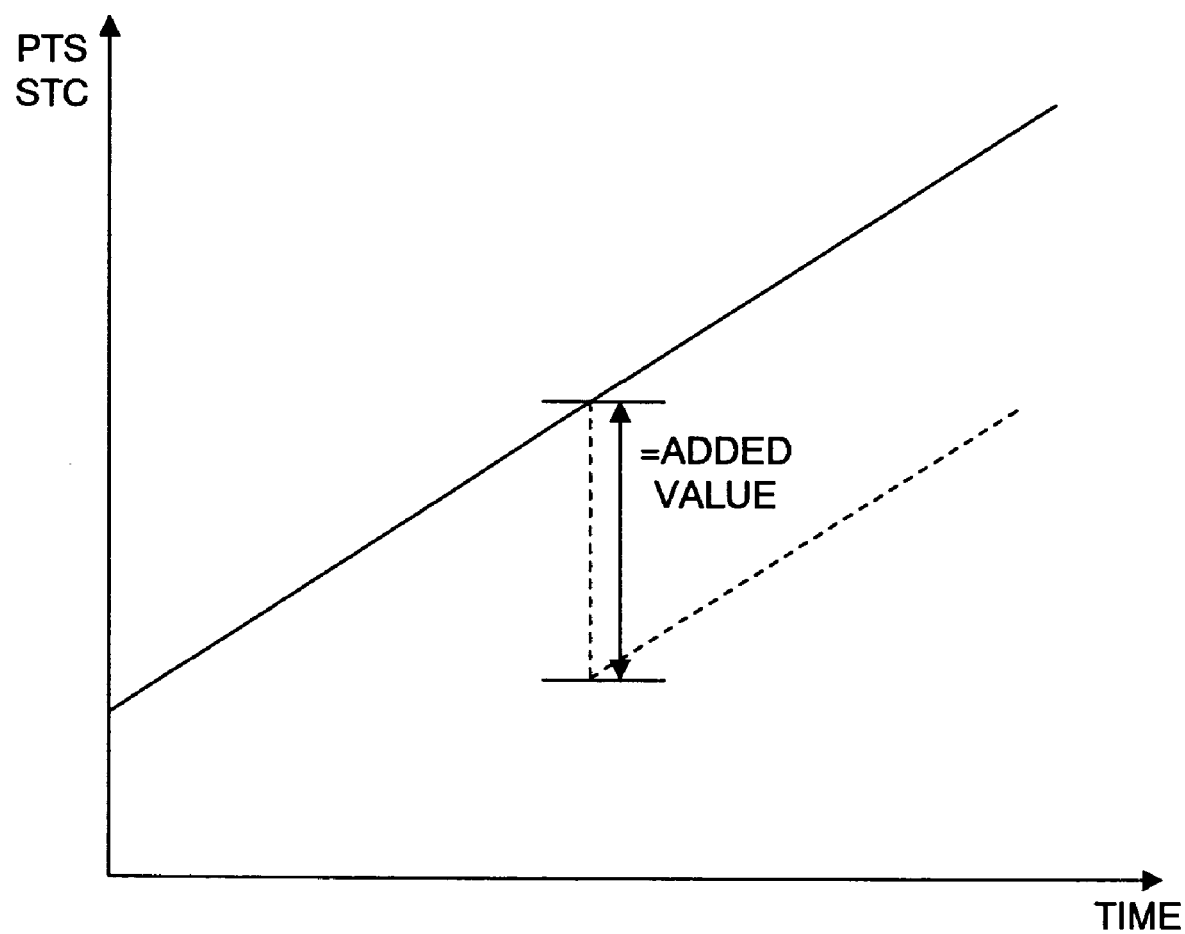
FIG. 6B is an explanatory chart showing the operation of the embodiments shown in FIG. 5A and FIG. 5B.

FIG. 6B is a view showing the operation of the embodiments shown in FIG. 5A and FIG. 5B, and in particular, showing the value to be added to the original value of the PTS. In FIG. 6B, the horizontal axis takes the time and the vertical axis takes the PTS.

A new PTS resulting from the addition of such a value is a PTS corresponding to a jump amount of the playback position, so that the playback state smoothly continues. DTS may be rewritten similarly. Further, the main video/sub-video/audio stream dividing IC 50 may be constituted of a plurality of functionally divided ICs, instead of one IC.

The present invention is not limited to the specific forms described here with the illustrations, but it is to be understood that all the changes and modifications without departing from the range of the following claims are to be included therein.

What is claimed is:

1. A DVD (digital versatile disc) playback apparatus, comprising:
    a first infegrated circuit including a system time clock value out put circuit outputting a value of a system time clock at a timing synchronous with a vertical synchronizing signal;
    a second integrated circuit including a vertical synchronizing signal output circuit outputting the vertical synchronizing signal;
    an H.264 codec integrated circuit having: a first interface to which the outputted value of the system time clock is inputte; a second interface to which the outputted vertical synchronizing signal is inputted; a comparing circuit which compares at a timing synchronous with the inputted vertical synchronizing signal a value of a presentation time stamp included in an inputted main vodeo data stream with theinoutted value of the system time clock; and a decoding circuit which updates and outputs a decoded result when a result of the comparison in the comparing circuit shows that the value of the system time clock is equal to or larger than the value of the presentation time stamp;
    a sub-video decoder IC having: a first interface to which the outputted value of the system time clock is inputted; a second interface to which the outputted vertical synchronizing signal is inputted; a comparing circuit which compares at a timing synchronous with theinputted vertical synchronizing signal a value of a presentation time stamp included in an inputted sub-video data stream with theinputted value of the system clock; and a decoding circuit which updates and outputs a decoded result when a result of the comparison in the comapring circuit shows that the value of the system time clock is equal to or larger than the value of the presentation time stamp; and
    an audo decoder integrated circuit having: a first interface to which the outputted value of the system time clock is inputted; a second interface to which the outputted vertical synchronizing signal is inputtted; a comparing circuit which compares at a timing synchronous with the inputted vertical synchronizing signal a value of a presentation time stamp included in an inputted audio data stream with the inputted value of the system time clock; and a decoding circuit which outputs a decoded result when a result of the comparison in the comparing circuit shows that the value of the system time clock is equal to or larger than the value of the presentation time stamp;
    wherein the first integrated circuit, further comprising:
        a function of demultiplexing the inputted data stream to a main video data stream, a sub-video data stream, and an audio data stream; and
        a function of rewriting respective values of the presentation time stamps/decode time stamps included in the main video data stream, the sub-video data stream, and the audio data stream obtained by the demultiplexing, and
    wherein the main video data stream, the sub-video data stream, and the audio data stream obtained by the demultiplexing are supplied to the H.264 codec integrated circuit, the sub-video decoder integrated circuit, and the audio decoder integrated circuit respectively;
    wherein the function of rewriting the values of the presentation time stamps/decode time stamps in the first integrated circuit is a function of rewriting by adding, to the value of the presentation time stamp/decode time stamp before the rewrite, a difference value between a playback end time of VOB (video object) unit video data at an instant prior to system time clock discontinuity and a playback start time of the VOB unit video data at an instant after the system time clock discontinuity.

* * * * *